Patented Apr. 16, 1940

2,197,566

UNITED STATES PATENT OFFICE 2,197,566

PLASTER

Paul S. Denning, Joliet, Ill., assignor to F. E. Schundler & Co., Inc., Joliet, Ill., a corporation of Illinois No Drawing. Application February 20, 1937, Serial No. 126,813

3 Claims. (Cl. 106—34)

This invention relates to wall plaster and the like and among other objects aims to provide a wall plaster which has both insulating properties and the qualities of a good wall plaster.

The nature of the invention may be readily understood by reference to one material embodying the invention and described in the following specification.

The illustrative embodiment of the invention here described is a wall plaster comprising a binding cement such as calcined gypsum and exfoliated vermiculite having controlled water absorbing properties, together with a material for giving the plaster adequate impact resistance. It has been proposed heretofore to combine gypsum and ordinary exfoliated vermiculite, but the resulting material does not possess the required plaster characteristics and has had, therefore, no practical use as a wall plaster or the like.

Exfoliated vermiculite is an alteration product comprising particles of certain micaceous minerals such as biotite, which exfoliate or expand to many times their original size upon the application of heat to produce a granular material which is an extremely efficient insulator, highly refractory and very light in weight. When exfoliated, the extremely thin and polished laminae which characterize the structure of the material are very slightly separated (their separation being responsible in part for the excellent insulating qualities of the material) forming a multitude of spaces which are capillary in character and capable of taking up and holding large quantities of water.

The water absorbing and holding properties of the vermiculite are controlled and limited in the inventive plaster by associating with the vermiculite a minute amount of a colloidal or finely divided water repellant material such as an insoluble soap which functions to limit absorption of water without filling the capillary spaces in the vermiculite and therefore without impairing its insulating efficiency. Among the insoluble soaps, zinc stearate may advantageously be employed because of its relatively low cost. The amount of water repellant material employed is adjusted to limit the water absorbed by the vermiculite to that amount which is necessary to give the plaster the proper suction. It will be understood that the expression "suction" is intended to define that quality of wall plaster which causes and facilitates the bonding thereto of a subsequently applied coat of plaster or other material. Bonding between one coat of plaster and the next is caused by the intercrystallization or interlocking of crystals effected by the absorption into the under coat of water containing plaster which, upon setting or crystallization, effects the necessary bond. Suction greater than that necessary simply to effect the aforesaid bond is objectionable because of abstraction of water required for the crystallization of an applied plaster coat, thereby preventing proper hardening and crystallization of such plaster. Furthermore, excess water absorbing capacity prolongs the period of drying. Indeed, the water absorption of vermiculite alone, if uncontrolled, is so great as to make it practically impossible to dry out the plaster after application.

It has been found that by the use of one-half of one per cent or less of zinc stearate, the suction or water absorbing properties of the plaster may be controlled and limited to the aforesaid desired amount. Indeed, as little as .16 (sixteen hundredths) per cent of zinc stearate is effective for this purpose, though a greater amount may, in some instances, be desired. It should be understood that the insoluble soap does not wholly prevent water absorption but simply limits the water absorbed by the vermiculite to a small fraction of what would otherwise be its total water absorbing capacity.

To give the plaster adequate impact resistance and improved troweling qualities, a substantial quantity of hard mineral, such as sand, is added to the plaster. As regards troweling properties, the addition of sand produces unexpected results. It endows the plaster with excellent working properties even under wood tools such as floats and darbies.

The resulting plaster possesses not only the hardness or impact resistance required of plaster, but possesses high insulating properties. These properties are particularly advantageous in connection with fire resistance. The gypsum in the present plaster is an excellent fire retarder because heat cannot be transmitted through a coat of such plaster until the plaster has been completely recalcined, thus retarding transmission of heat for a substantial period during which ordinary fires would be extinguished. With the addition of exfoliated vermiculite to the plaster, the penetration of the heat necessary to effect calcination of the interior or remote plaster is substantially retarded. The multitude of thin and highly polished laminae of the vermiculite are particularly efficient in resisting transmission of radiant heat, such as would be evolved in a fire. The inventive plaster, therefore, provides an excellent protective covering for metal structural members and other elements likely to be permanently damaged by heat and for stairwells and other locations usually subjected to severe exposure to fire. As a fire retarder, the inventive plaster is superior both to neat gypsum plaster and to the ordinary plaster sand mixture. Neat gypsum shrinks and cracks excessively and must be extended with sand or the like. On the other hand, the high percentage of sand usually employed in gypsum substantially increases its heat conductivity.

In addition to its fire retarding properties, the inventive plaster is somewhat elastic and relatively non-cracking. The plaster also possesses excellent troweling properties partly due to the lubricating qualities of the vermiculite laminae. The controlled water absorption and suction properties of a hardened and dry plaster coat give it an efficient plaster receiving and bonding surface which greatly facilitates the application of a finish or other plaster coat.

The proportions of exfoliated vermiculite, binding cement (such as gypsum), and sand may be considerably varied, depending upon the particular properties desired. Increase of the proportion of sand raises the impact resistance, and decrease in the proportion of exfoliated vermiculite reduces the insulating properties of the plaster coat. Increase in the amount of water repellant substance reduces the suction of the plaster and the absorption of water by the vermiculite. One satisfactory plaster comprises approximately the following:

|  | Per cent by weight |
|---|---|
| Calcined gypsum (including the usual retarder, and fiber if desired) | 56 |
| Sand | 27 |
| Exfoliated vermiculite (approx.) | 17 |
| Insoluble soap, such as zinc stearate | 16 |

While it would be possible to produce an insoluble soap by reaction between a soluble soap (mixed with the plaster) and the soluble fraction of the gypsum (calcium sulphate) to produce calcium stearate, an insoluble soap, this method of introducing of insoluble soap into the plaster does not seem to possess any advantages over the direct addition of the insoluble soap.

The exfoliated vermiculite should preferably be fairly fine so as to decrease the size of the pores in the plaster. One satisfactory screen analysis of the suitable exfoliated vermiculite is as follows:

|  | Per cent |
|---|---|
| Through 10 mesh | 100 |
| Through 20 mesh | 50 |
| Through 60 mesh | 10 |

It will be understood, of course, that the foregoing mixtures and proportions are illustrative only and are capable of substantial variation, depending upon the properties desired.

Obviously the invention is not limited to the details of the illustrative material since these may be modified. Moreover, it is not indispensable that all features of the invention be used conjointly since various features may be used to advantage in different combinations and sub-combinations.

Having described my invention, I claim:

1. A fire resisting insulating wall plaster of the character described comprising in combination calcined gypsum or the like, granules of exfoliated vermiculite, and a quantity of insoluble soap in contact with the granules of vermiculite to reduce the normal suction of the granules, the amount of insoluble soap being limited so as to permit a slight amount of water absorption to give the plaster the necessary suction to bond a subsequently applied plaster coat, and a quantity of sand to provide a hard wall surface having impact resistance comparable to ordinary wall plaster.

2. A fire resisting insulating plaster comprising in combination granules of exfoliated vermiculite, a plaster cementing substance such as gypsum, and a fraction of a per cent of insoluble soap directly in contact with the vermiculite granules to control and limit the normal suction produced by the capillary spaces of the vermiculite, the said insoluble soap functioning to maintain the insulating efficiency of the vermiculite and being present in such amount as to control and limit suction without wholly preventing it, and sand in said plaster to give the same impact resistance and troweling qualities.

3. The method of controlling the suction and water absorbing capacity of a fire resisting insulating wall plaster comprising a binding cement and granules of exfoliated vermiculite normally having a high water absorbing capacity which is characterized by intimately associating with the granules of vermiculite a minute amount of a water repellent substance which functions without filling the capillary spaces of the vermiculite to limit without entirely preventing the normal suction resulting from such capillary spaces, adjusting the amount of the water repellent substance to permit enough suction to bond a subsequently applied plaster coat, and mixing sand with said plaster to improve its trowelling properties and give it substantial impact resistance.

PAUL S. DENNING.

CERTIFICATE OF CORRECTION.

Patent No. 2,197,566. April 16, 1940.

PAUL S. DENNING.

It is hereby certified that error appears in the printed specification of the above numbered patent requiring correction as follows: Page 2, first column, line 41, in the table, for "16" read --.16--; and that the said Letters Patent should be read with this correction therein that the same may conform to the record of the case in the Patent Office.

Signed and sealed this 4th day of June, A. D. 1940.

(Seal)

Henry Van Arsdale,
Acting Commissioner of Patents.